Figure 1:
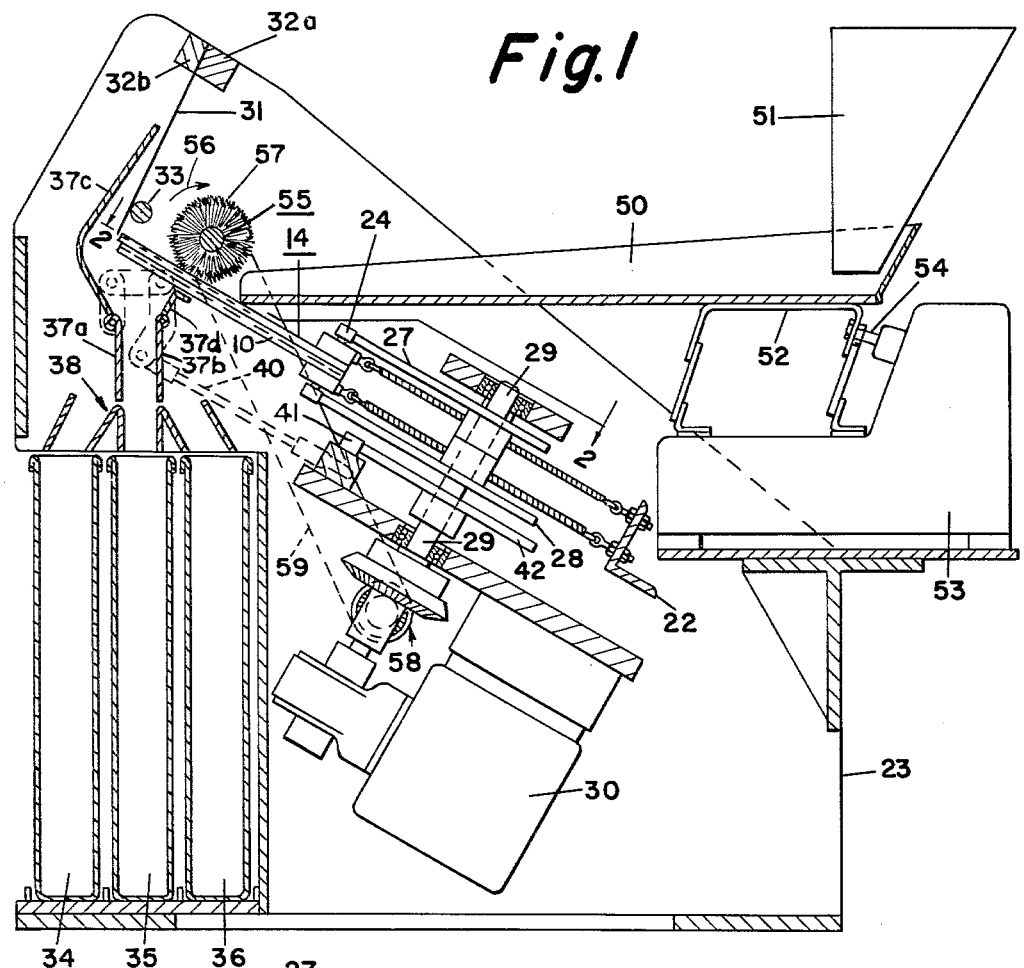

Feb. 22, 1966    M. M. BRENNER ETAL    3,236,375
MECHANICAL APPARATUS AND METHOD
Filed June 25, 1962    2 Sheets-Sheet 1

INVENTORS:
MILLARD M. BRENNER
JOSEPH F. SIBLEY
BY Alfred Stapler
ATTORNEY

Feb. 22, 1966  M. M. BRENNER ETAL  3,236,375
MECHANICAL APPARATUS AND METHOD
Filed June 25, 1962  2 Sheets-Sheet 2

INVENTORS:
MILLARD M. BRENNER
JOSEPH F. SIBLEY
BY *Alfred Haysler*
ATTORNEY

United States Patent Office 3,236,375
Patented Feb. 22, 1966

3,236,375
MECHANICAL APPARATUS AND METHOD
Millard M. Brenner, Radnor, and Joseph F. Sibley, Philadelphia, Pa., assignors to General Atronics Corporation, Wyndmoor, Pa., a corporation of Pennsylvania
Filed June 25, 1962, Ser. No. 204,761
19 Claims. (Cl. 209—108)

This invention relates to a method of an apparatus for classifying objects according to their lengths. In particular it relates to a method of an apparatus for segregating rapidly and automatically oblong objects depending on whether their long dimension is greater or less than a predetermined limiting value. This type of classification is useful in many operations. For example, corn kernels are used for different purposes depending on their lengths, those above a certain length limit being used for seed, while those below that same limit are used for other purposes, such as chicken feed. Since seed corn commands a much higher price than feed corn, it is important to segregate corn kernels accurately in relation to said limit.

Known devices for performing this type of classification, or segregation all leave a great deal to be desired in terms of their ability to perform such functions as distinguishing between the long and the short dimension of the oblong object to be classified, performing the classification with accuracy, and performing the classification at a high rate of speed. In particular, these known devices fall short of combining the desired accuracy and speed.

Accordingly, it is a prime object of the invention to provide a method of an apparatus for reducing the severity of one or more of the above-mentioned shortcomings of prior art devices.

It is another object of the invention to distinguish reliably between the long and short dimensions of oblong objects.

It is still another object to classify objects reliably depending on whether their long dimension does or does not exceed a predetermined limit.

These, and other objects which will appear, are achieved in accordance with this invention by lengthwise positioning each object to be classified in the gap between a rigid and resilient member, narrowing this gap to a distance which is slightly less than the limiting length of said object while supporting said object from below, removing said support, and widening said gap beyond said limiting length.

As the above-mentioned gap is narrowed, any object whose length exceeds the limit will be clamped between the rigid member and the resilient member due to the resistance to deflection by the object which is exerted by said resilient member. On the other hand, any object whose length is below the limit will not be so clamped but will be positioned loosely within the gap between the rigid and resilient members.

Consequently, when the support is removed from below the objects in question, any which are below the length limit will drop from the gap at that time, whereas any which are above the length limit will not drop until the gap is again widened beyond the limiting length. Different receptacles can then be used to catch and accumulate the objects released during the two different stages described above.

In this way the objects in question are segregated depending upon whether their lengths do or do not exceed a given limit.

Figure 4:
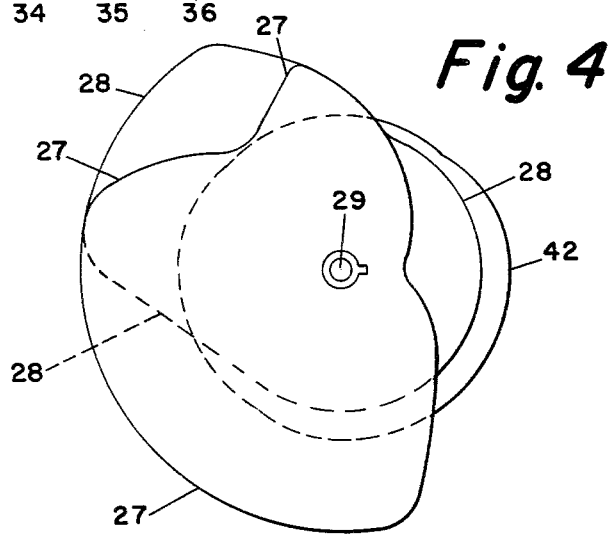
Figure 2:
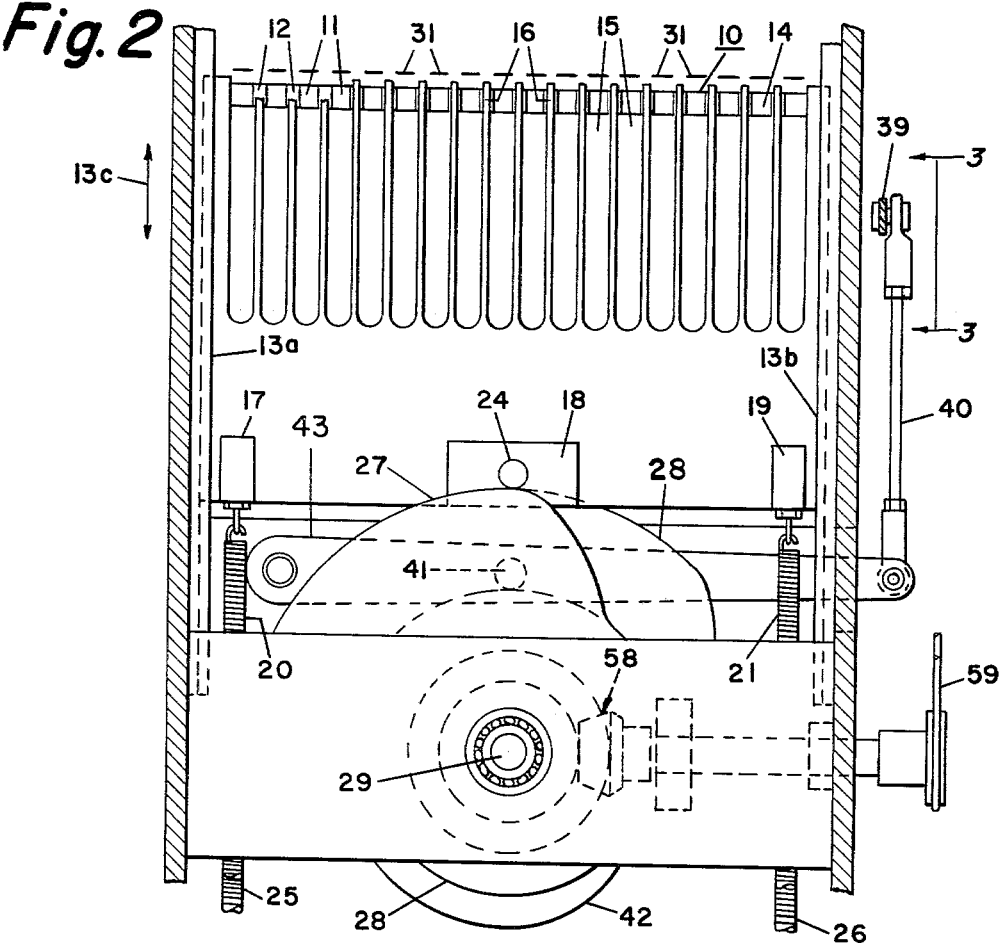
Figure 3:
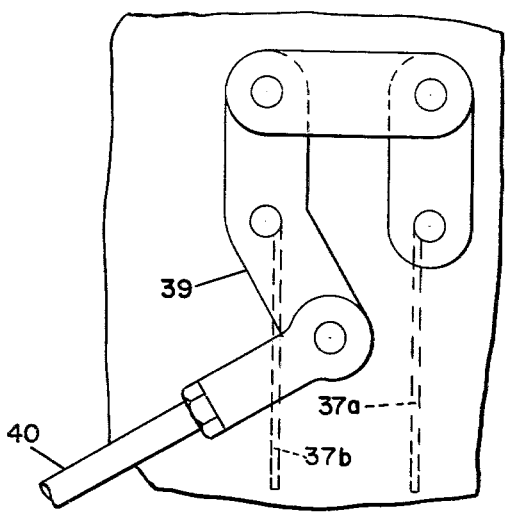

For further details, reference may be had to the accompanying drawings wherein:

FIGURE 1 is a side elevation view of the principal components or a preferred embodiment of the invention, FIGURE 2 is an enlarged view of the embodiment of FIGURE 1 taken along the lines 2—2 in FIGURE 1, and FIGURE 3 is an enlarged detail view of certain of the components in FIGURE 1, and FIGURE 4 is an enlarged top view of some of the components illustrated in FIGURE 1.

The same reference numerals are used in the several figures to designate identical components.

Referring now to FIGURES 1 and 2, the apparatus embodying this invention comprises a first shuttle plate 10, containing in its top surface a plurality of round-bottomed grooves 11 separated by ridges 12. Preferably these grooves extend the full length of shuttle plate 10. Shuttle plate 10 is supported at its right and left-hand edges by tracks in supporting rails 13a and 13b (see FIGURE 2) which permit this plate to slide back and forth, parallel to the longitudinal axes of grooves 11. The reciprocating motion of this plate is indicated by the two-headed arrow 13c. As shown in FIGURE 1, the plane of shuttle plate 10 is inclined upwardly from the horizontal, the preferred angle of inclination being approximately 30 degrees. Immediately above shuttle plate 10 is a second shuttle plate 14, whose top surface preferably contains grooves 15, aligned with respective grooves 11 in the top surface of shuttle plate. 10. Preferably grooves 15 do not extend the full length of shuttle plate 14, thereby providing, at the rear end of plate 14, a flat upper surface to which other objects can be conventiently attached, as discussed more fully hereinafter. The right and left-hand edges of shuttle plate 14 are also supported by tracks in supporting rails 13a and 13b, which permit plate 14 to slide back and forth parallel to shuttle plate 10, again as indicated by arrow 13c in FIGURE 2. At its more elevated edge, shuttle plate 14 is equipped with protruding extensions 16, which are aligned with the ridges 12 of shuttle plate 10 and extend beyond said edge of shuttle plate 14 by a distance approximately equal to, and preferably slightly less than the length of the longest object to be classified. When the upper shuttle plate 14 contains grooves such as shown at 15 in FIGURE 2, extensions 16 may simply be continuations of the ridges between these grooves of a height approximately the same as the full thickness of plate 14. Three of these extensions 16 ar shown partially broken away in FIGURE 2 to reveal the ridges 12 in shuttle plate 10, which are located beneath them.

For convenient identification the edge of each shuttle plate which is closest to extension 16 will be referred to herein as its leading edge, while the opposite edge will be referred to as its trailing edge.

To the top surface of shuttle plate 14, near its trailing edge, there are attached three mounting blocks 17, 18 and 19. Blocks 17 and 19 are placed at opposite corners of the plate, while block 18 is centered between them. A coil spring 20 links block 17 to a bracket 22, while another coil spring 21 links block 19 to the same bracket 22. Bracket 22 is fixedly attached to the frame 23 which supports the entire apparatus shown in the drawings. Springs 20 and 21 are so constructed as to always exert on plate 14 a force tending to pull it toward bracket 22. On block 18 there is mounted a cam follower 24, which may consist, for example, of a ball bearing whose inner race is attached fixedly to the block 18, while its outer race is free to rotate about an axis transverse to the plane of shuttle plate 14.

A set of three mounting blocks (not visible in FIGURE 2) corresponding to blocks 17, 18 and 19 are attached to the lower surface of shuttle plate 10, near the trailing edge of the latter. The two corner blocks are again linked to bracket 22 by springs 25 and 26, which exert on shuttle plate 10 a force tending to pull it toward the bracket, while the middle block has depending therefrom a cam follower similar to follower 24 mounted on block 18.

Two cam shaped wheels 27 and 28, mounted one above the other on a common shaft 29 extending upwardly behind the trailing edges of shuttle plates 10 and 14, engage with their respective outer rims cam follower 24 mounted on top of shuttle plate 14 and the corresponding cam follower (invisible in FIGURE 2) mounted below shuttle plate 10.

Driving means 30, which may take the form of an electric motor, for example, is coupled to the lower end of shaft 29 to impart thereto a rotary motion.

As drive means 30 turns shaft 29, and with it cam wheels 27 and 28, the latter will, via the cam followers, impart to shuttle plates 10 and 14 reciprocating motions in the directions indicated by arrow 13c in FIGURE 2. The relationship between these motions, and the cam configurations necessary to produce them, will be discussed more fully hereinafter.

Somewhat ahead of the most advanced position which the leading edge of top shuttle plate 14 is capable of reaching in its reciprocating motion there are placed a plurality of leaf springs 31 (see FIGURE 1). These springs are so positioned that, when undeflected, their surfaces form approximately a right angle with the planes of shuttle plates 10 and 14. The upper ends of these springs may be rigidly clamped between mounting bars 32a and 32b, while their bottom ends are unattached, and extend freely downward, one such spring terminating in front of, and in alignment with the space between each pair of extensions 16. A short distance above these unattached ends of springs 31, but far enough to clear any objects which may be placed between extensions 16 for classification by the machine, there is mounted a bar 33, paralleling and in contact with those surfaces of springs 31 which are nearest the shuttle plates. Bar 33 may be of circular cross-section, but is mounted at each end for rotation about a longitudinal axis off-set from the center of the circle forming its cross-section. This mounting, which is not shown in FIGURE 1 in order to avoid unnecessary detail, may be of any conventional form capable of holding bar 33 firmly in any particular angular orientation once it has been placed therein. For example, a simple set-screw may be used to tighten down on a shaft forming an extension of its axis of rotation at the point where that shaft is journaled to allow rotational adjustment. Preferably this bar 33 is so positioned relative to springs 31 as to exert at least some bias pressure on the springs at every bar orientation.

Three object collector bins 34, 35 and 36, all open at their tops, are positioned next to each other generally below springs 31. A pair of movable deflector plates 37a and 37b are mounted above the collector bins. These deflector plates, which form continuations of stationary guide plates 37c and 37d, respectively, are recurrently deflectable in unison between three positions. In one of these positions, they, together with two of the fixed deflector plates of deflector structure 38, define a sloping passage leading from the area between springs 31 and the leading edges of the shuttle plates into collector bin 36. In another of their three positions they, together with two of the fixed deflector plates, define a vertical passage leading from said area into collector bin 35. This is the position in which these deflector plates are shown in FIGURE 1. Finally, in their third position they, together with two fixed deflector plates, define a sloping passage leading from said area into bin 34. To enable them to assume these different positions, each movable plate is mounted at its upper edge for rotation about a horizontal axis. A crank-type linkage 39 shown separately and in enlarged form in FIGURE 3 connects the axes of the two plates to each other and to an actuating lever 40, which, as shown in FIGURE 2, is given the appropriate motion by a cam follower 41 engaging the outer periphery of a cam-shaped wheel 42, also mounted on shaft 29 for rotation by said shaft together with cam wheels 27 and 28. Cam follower 41 may be of similar construction to cam follower 24 and may be mounted on a lever 43 attached pivotally to the frame of the machine at one end, and to lever 40 at the other. Either gravity or a spring causes the cam follower 41 to always bear on the periphery of cam 42.

The fixed deflector plates constituting deflector structure 38 shown in FIGURE 1 cooperate with the movable deflector plates 37a, 37b and fixed guide plates 37c, 37d, as shown in FIGURE 1, to provide substantially continuous paths leading into the various bins 34, 35 or 36. It will be understood that all of the guide and deflector plates discussed above are sufficiently wide to guide into the collector bins objects discharged from any point on the leading edges of plates 10 and 14.

Referring again to FIGURE 1, a trough extends from a position just above the top surface of the upper shuttle plate 14 to a position below an open-bottom hopper 51. Although this is not essential, trough 50 preferably has grooves, at least near its discharge end, which gradually deepen toward the discharge end and are aligned with the grooves in shuttle plate 14. Both trough 50 and hopper 51 are preferably wide enough so that the objects to be classified, which are conveyed (in a manner described hereinafter) along the trough from the hopper to the shuttle plate, are distributed upon discharge from the trough across the full grooved width of that plate. Trough 50 is supported by a stand 52, which is mounted resiliently on base 53. Base 53 contains a conventional electromechanical vibrator (not shown) which transmits a reciprocating lengthwise motion to trough 50 via shaft 54. As is well known, by making the forward motion of this trough (toward the left in FIGURE 1) slow and its backward motion (toward the right in FIGURE 1) fast, the objects in the trough advance progressively toward shuttle plate 14 and are eventually discharged onto its top surface. The discharge end of trough 50 (its left-hand end in FIGURE 1) is so positioned in relation to shuttle plate 14 that, when said plate is farthest from springs 31, its leading edge is retracted behind the discharge end of trough 50 (i.e. below and to the right of said discharge end in FIGURE 1). In that position, objects discharged from the trough drop in front of said leading edge, land on the top surface of the lower shuttle plate 10, which never retracts behind, but always extends beyond the discharge end of the trough.

Ahead of the discharge end of trough 50 (above and to the left thereof in FIGURE 1) there is placed a cylindrical brush 55, rotatable in the direction of arrow 56 about a horizontal axis extending at right angles to the direction of motion of shuttle plate 14. This brush is positioned so that those of its bristles 57 which are nearest plate 14 end jut above the top surface of that shuttle plate. This brush 55 extends across the entire width of shuttle plate 14 and is kept in continuous rotation in the direction of arrow 56 in FIGURE 2 by any conventional drive means such as gear mechanism 58 and belt drive 59.

The objects which are to be classified, e.g. corn kernels, are placed loosely in hopper 51. These objects gradually descend into trough 50 through the open bottom of the hopper. As previously explained, vibration of trough 50 by shaft 54 causes the objects in the trough to move toward the discharge end of the trough. As previously noted, the shuttle plates 10 and 14 reciprocate in the direction of arrow 13c in such a way that the upper shuttle plate 14 periodically retracts behind the discharge end of trough 50. During this retraction of the upper shuttle plate 14, the lower shuttle plate 10 continues to extend beyond the discharge end of trough 50, preferably far enough to provide a bridge between said discharge end and fixed guide plate 37d (FIGURE 1). Upon returning past the discharge end of trough 50, shuttle plate 14 picks up between each adjacent pair of extensions 16 one of the objects discharged from trough 50. These extensions 16 are preferably spaced apart by a distance slightly greater than the greatest transverse dimension (or short axis) of the oblong objects being classified. On the other hand the round-bottomed grooves 11 in shuttle plate 10 are preferably slightly narrower, and in no case wider than said greatest transverse dimension. Shuttle plate 14 then begins to move toward springs 31, carrying with it the objects picked up, as explained above, between its extensions 16. When the leading edge of plate 14 comes within a distance approximately equal to the average length of the objects being classified from the leading edge of plate 10, the latter also begins to move toward springs 31, in unison with plate 14. It will be apparent that, by this time, only one such object will have been able to remain in the space between any two adjacent extensions 16, additional objects, ahead of those in that space, having by then dropped off the leading edge of the lower shuttle plate 10. These latter objects fall into container 36, into which they are guided by deflector plates 37a and 37b, which, during this portion of the operation of the machine, are deflected by linkage 39 into positions defining a passage into that container. At the same time, brush 55, rotating in the direction of arrow 56, as previously indicated, sweeps any objects extending above the top surface of the upper shuttle plate 14 off this top surface and into the space between the leading edges of the shuttle plates and springs 31. These swept-off objects then also fall into container 36 under the guidance of deflector plates 37a, 37b.

While the lower shuttle plate 10 continues to advance in the direction of springs 31, as explained above, the corresponding advance of the upper shuttle plate 14 is temporarily slowed, or preferably even reversed. As a result, the objects located between adjacent extensions 16 of that shuttle plate tend temporarily to lose contact with its leading edge and to slide downwardly along the inclined top surface of the lower shuttle plate (i.e. downwardly and to the right in FIGURE 1). We have found that this enhances the tendency of these objects to align themselves with their long axes parallel to the grooves 11 in the lower shuttle plate and come to rest with this orientation against the leading edge of the upper shuttle plate 14. The advance of the upper shuttle plate 14 toward springs 31 resumes after the interruption discussed above, and continues until the leading edge of this upper shuttle plate has reached a distance from said springs which is slightly less than that length at which it is desired to segregate the objects being classified. During this entire period the objects to be segregated are, of course, supported from below in grooves 11 of shuttle plate 10. As soon as the advance of shuttle 14 stops, deflector plates 37a, 37b are shifted by linkage 39 into positions in which they define a passage leading into container 35 rather than into container 36. Immediately after this, the lower shuttle plate 10 is retracted behind the leading edge of upper shuttle plate 14 (i.e. below and to the right of said edge in FIGURE 1). This leaves all the objects positioned between adjacent extensions 16 unsupported from below. Any of these objects whose length is below the classification limit will cause little or no deflection of the leaf springs 31 with which they are aligned, and these springs will therefore not exert on them a force adequate to clamp them between said springs and the leading edge of plate 14. These too-short objects therefore drop into container 35. Next the deflector plates 37a and 37b are displaced by linkage 39 so as to define a passage leading into container 34, after which the upper shuttle plate 14 is retracted from its position at the above-mentioned distance from leaf springs 31. This retraction releases any objects whose lengths exceed the classification limit. These latter objects caused enough deflection of springs 31 to become clamped between the leading edge of the upper shuttle plate 14 and said leaf springs by the deflection-opposing force of the latter. There they had remained clamped until the retraction of shuttle plate 14. The objects released by this retraction of plate 14 fall into container 34. The operating cycle described above is then repeated.

Any objects which are discharged from trough 50 while the leading edge of shuttle plate 14 extends beyond the discharge end of said trough will land on the top of said shuttle plate directly in front of said discharge end and will tend to remain in place due to the force of gravity which urges them back toward the trough along the inclined plane constituted by shuttle plate 14. This effect ont only prevents such objects from being carried into the path of brush 57, but also overcomes the forces generated by the vibration of trough 50 which tend to cause additional objects to be discharged from the trough.

As a result, generally speaking, only a single row of the objects in question is discharged between successive retractions of the leading edge of shuttle plate 14 behind the discharge end of trough 50. This row is then cleared away from said discharge end by the forward motion of said shuttle plate, as described above, permitting the discharge of a new row of such objects in preparation for the next cycle of the machine. Occasionally, objects do get entrained by the shuttle plate above its top surface, rather than between its extensions 16 and these are then cleared off by brush 57.

An appropriate set of shapes for motion-controlling cams 27, 28 and 42 of FIGURES 1 and 2 is illustrated in FIGURE 4, which is a view of said cams, and of the common shaft 29 on which they are all mounted, looking down from above along the axis of said shaft. It will be understood, of course, that the length of stroke of the various reciprocating motions, their relative timing, and other parameters can be readily varied to meet any particular set of requirements by appropriate modification of the sizes and/or shapes of these cams in accordance with well known practice.

The same machine, without any change in the cams, can be adjusted to classify objects on the basis of different limiting lengths by rotation of eccentric shaft 33 (see FIGURE 1). When this shaft is rotated so that the distance from its axis of rotation to the points at which its periphery contacts springs 31 is a maximum, then the limiting length will also be a maximum. Conversely, when said distance is a minimum, the limiting length will also be at a minimum. Intermediate positions of shaft 33 give intermediate adjustments of the limiting length. For adjustments of the limiting length beyond the extent possible by rotation of shaft 33, the length of hte stroke of the shuttle plates, or the position of the spring holders 32a, 32b or both, must be changed.

tI will be understood that many modifications of the apparatus described above can be made with out departing from the inventive concept. For example, gentle vibration may be applied to shuttle plates 10 and 14, to enhance still further the tendency of the objects being classified to align themselves lengthwise of the grooves. Moreover, the apparatus is not limited in its applicability to oblong objects but may also be employed to advantage in classifying completely spherical objects, for example.

Accordingly, we desire the scope of that concept to be limited only by the appended claims.

We claim:
1. The method of classifying objects in accordance with their lengths, said method comprising the steps of:
   positioning each said object in the gap between a rigid and a resilient member, while supporting said object from below;
   narrowing said gap until any object in excess of a predetermined length is retained between said members by pressure exerted on said object by said resilient member, while continuing to support said object from below;
   removing said support from below said object; and
   widening said gap until any said retained object is released from between said members.

2. The method of claim 1 characterized in that said steps are cyclically repeated.

3. The method of claim 1 characterized in that said objects released by widening said gap are segregated from any released prior to said widening.

4. The method of claim 3 further characterized in that said segregaiton is accomplished by guiding a different directions objects released before and after said widening of said gap.

5. The method of claim 1 further characterized in that said objects are oblong and are aligned lengthwise of said gap.

6. Apparatus for separating oblong objects longer than a predetermined limit from those shorter than said limit, said apparatus comprising:
   a rigid member;
   a resilient member spaced from said rigid member;
   means for recurrently reciprocating said members toward and away from each other;
   means for placing one said object lengthwise in the space between said members;
   means for supporting said object in said space from below while said space is greater than said limit; and
   means for withdrawing said support when said space is less than said limit.

7. The apparatus of claim 6 characterized in that said rigid member is provided with a plurality of extensions protruding into said space toward said resilient member.

8. The apparatus of claim 6 characterized in that said supporting means comprises a plate having an elongated groove in its top surface for receiving and supporting said object.

9. The apparatus of claim 8 further comprising means for causing said grooved plate to reciprocate parallel to and in coordination with said rigid member.

10. The apparatus of claim 6 characterized in that said resilient member is formed by the deflectable end of a leaf spring.

11. Apparatus for separating oblong objects longer than a predetermined limit from those shorter than said limit, said apparatus comprising:
    a first reciprocable shuttle plate:
    a second shuttle plate disposed above and adjacent said first shuttle plate and reciprocable parallel to said first shuttle plate, said second shuttle plate having extensions in one edge defining a plurality of object receiving spaces;
    means for discharging different ones of said objects into different ones of said spaces when said second shuttle plate is at one extreme of its reciprocating motion;
    separate resilient means disposed opposite each said spaces and spaced from said one edge of said second shuttle plate by a distance slightly shorter than said limit when said second shuttle plate is at the other extreme of its reciprocating motion; and
    means for maintaining said first shuttle plate below said spaces during said motion of said second shuttle plate from said one to said other extreme.

12. The apparatus of claim 11 characterized in that each said resilient means is a separate leaf spring, attached at one end and extending at the other end into a position opposite one said space.

13. The apparatus of claim 11 comprising motor actuated cam means for reciprocating both said shuttle plates.

14. The apparatus of claim 13 further characterized in that said cam means is operative to withdraw said first shuttle plate from its position below said spaces before said second shuttle plate is withdrawn from its said other extreme of its reciprocating motion.

15. The apparatus of claim 14 further characterized in that said cam means is operative to interrupt temporarily said motion of said second shuttle plate from said one to said other extreme.

16. The apparatus of claim 11 further comprising a plurality of storage containers and means for deflecting objects from said spaces selectively into different ones of said containers.

17. The apparatus of claim 16 characterized by the provision of means for coordinating said deflecting means with said reciprocating shuttle motions.

18. The apparatus of claim 11 characterized in that said discharging means comprises a vibratory feed.

19. The method of aligning an oblong object with its long axis parallel to an elongated groove, said method comprising the steps of:
    placing said object of engagement with the edges of said groove, subject to a force tending to move it in one direction lengthwise of said groove;
    restraining said object from movement in said one direction, while displacing it in the opposite direction;
    and temporarily removing said restraint, thereby permitting said object to move in said one direction during said removal.

References Cited by the Examiner
UNITED STATES PATENTS

| | | | |
|---|---|---|---|
| 1,011,188 | 12/1911 | Griffin | 209—108 |
| 1,189,167 | 6/1916 | Parker | 209—85 |
| 1,552,397 | 9/1925 | Edwards | 209—99 |

ROBERT B. REEVES, *Primary Examiner.*

SAMUEL F. COLEMAN, *Examiner.*